US008707611B2

(12) United States Patent
Samaras et al.

(10) Patent No.: US 8,707,611 B2
(45) Date of Patent: Apr. 29, 2014

(54) TURKEY DECOY

(76) Inventors: Gregory Samaras, Woodside, NY (US);
Edward J. Boll, Stuyvesant, NY (US);
Jason D. Michael, Turbotville, PA (US)

( * ) Notice: Subject to any disclaimer, the term of this patent is extended or adjusted under 35 U.S.C. 154(b) by 120 days.

(21) Appl. No.: 13/030,229

(22) Filed: Feb. 18, 2011

(65) Prior Publication Data

US 2012/0167445 A1     Jul. 5, 2012

Related U.S. Application Data

(60) Provisional application No. 61/429,656, filed on Jan. 4, 2011.

(51) Int. Cl.
*A01M 31/06*     (2006.01)

(52) U.S. Cl.
USPC ........................................................ 43/2; 43/3

(58) Field of Classification Search
USPC ............................................................ 43/2, 3
IPC ......................................................... A01M 31/06
See application file for complete search history.

(56) References Cited

U.S. PATENT DOCUMENTS

| 4,590,699 A | * | 5/1986 | Nicks | 43/2 |
| 5,199,204 A | * | 4/1993 | Lowery | 43/2 |

* cited by examiner

*Primary Examiner* — Darren W Ark
*Assistant Examiner* — Timothy Schwarz
(74) *Attorney, Agent, or Firm* — Schmeiser, Olsen & Watts, LLP

(57) ABSTRACT

A turkey decoy or other animal hunting decoy is provided depicting a live mature animal, wherein certain body parts are dwarfed and diminished in size in comparison to the live mature animal it depicts. The decoy will further have colors thereon mimicking colors of the live mature animal eliciting a sexual response from the hunted live animal.

15 Claims, 6 Drawing Sheets

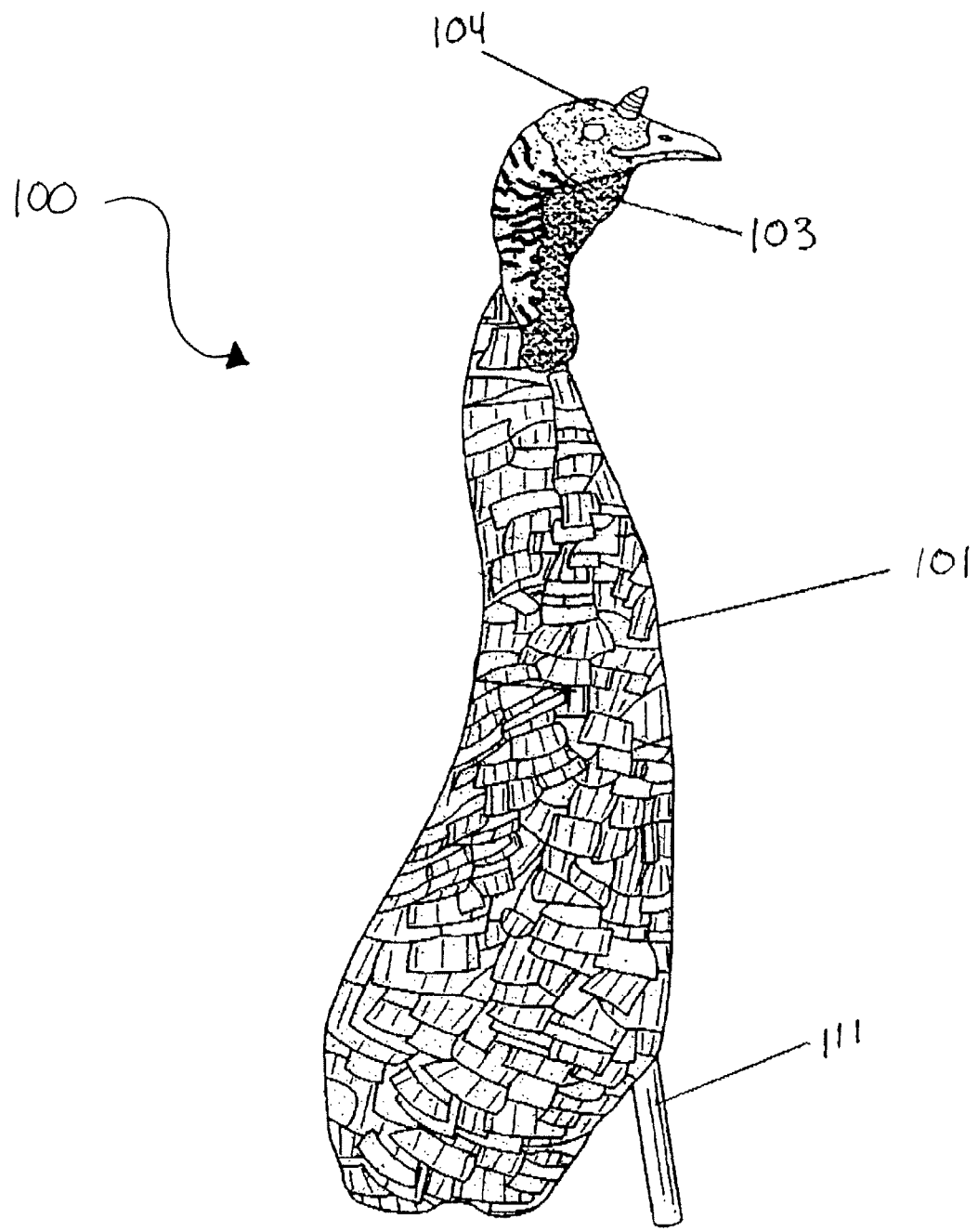

TURKEY DECOY

PRIORITY AND RELATED APPLICATION

This application claims priority to U.S. Provisional Patent Application Ser. No. 61/429,656, filed Jan. 4, 2011, and U.S. Design patent application Ser. No. 29/382,600, filed Jan. 5, 2011, entitled TURKEY DECOY, both of which are hereby incorporated by reference in its entirety.

FIELD OF THE INVENTION

The present invention relates to hunting decoys and methods of hunting using hunting decoys.

BACKGROUND OF THE INVENTION

Turkey and other animal hunting decoys are not uncommon in the prior art. The existence of these decoys rely on moving parts and having body parts with sizes and shapes that are comparable or equal to the body parts of its live mature animal counterpart. The conventional view in creating animal decoys for hunting is that the animal to be hunted will best be lured by an animal decoy that has the same dimensions as itself or similar animals in the field. However, hunting decoys that depart from the conventional wisdom of creating decoys with body parts comparable to those of its live mature animals are non-existent. The present invention addresses a need for decoys having body parts that are not proportionate or not to scale to body parts of live mature animals.

BRIEF SUMMARY OF THE INVENTION

A turkey decoy such as a wild tom turkey is provided depicting a live mature animal, wherein certain body parts are dwarfed and diminished in size when compared to the live mature animal. The decoy will further have colors thereon mimicking colors of the live mature animal eliciting a sexual response from the hunted live animal. The decoy will be depicted to be aggressive and confrontational despite the dwarfed and diminished size of certain body parts. The decoy may be a wild tom turkey or any other game animal that are hunted for instance the decoy may represent dwarfed and diminished deer, moose, etc all being mature and aggressive or confrontational.

DETAILED DESCRIPTION OF THE INVENTION

Figure 2:
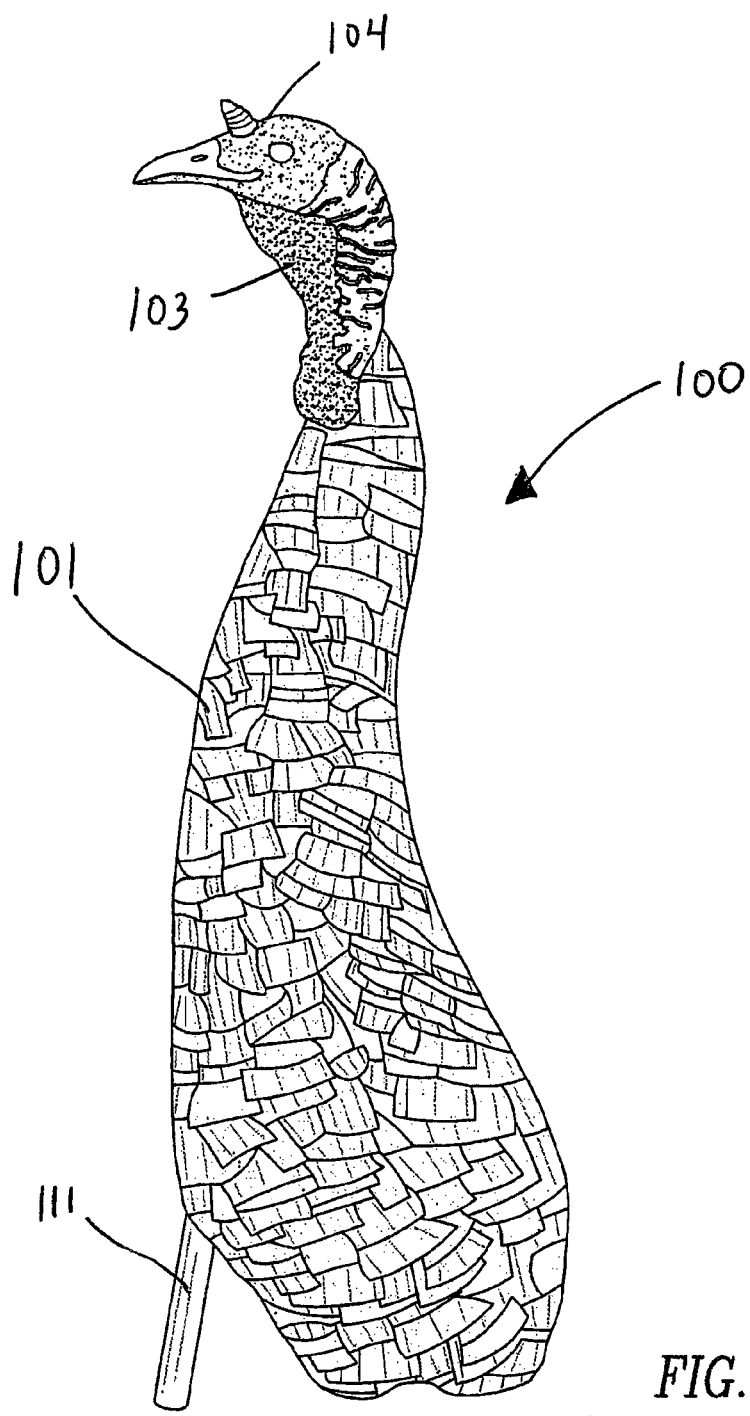
FIG. 2 is a left side view of the turkey decoy of FIG. 1.
Figure 3:
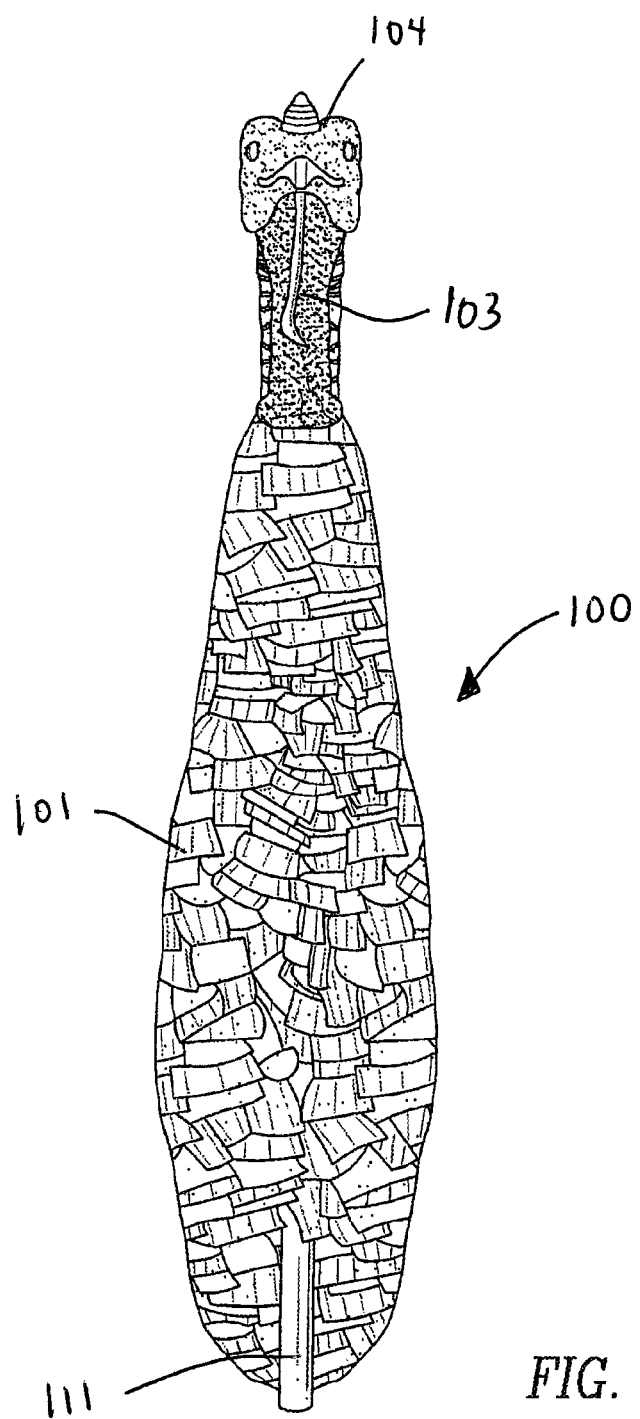
FIG. 3 is a front side view of the turkey decoy of FIGS. 1-2.
Figure 4:
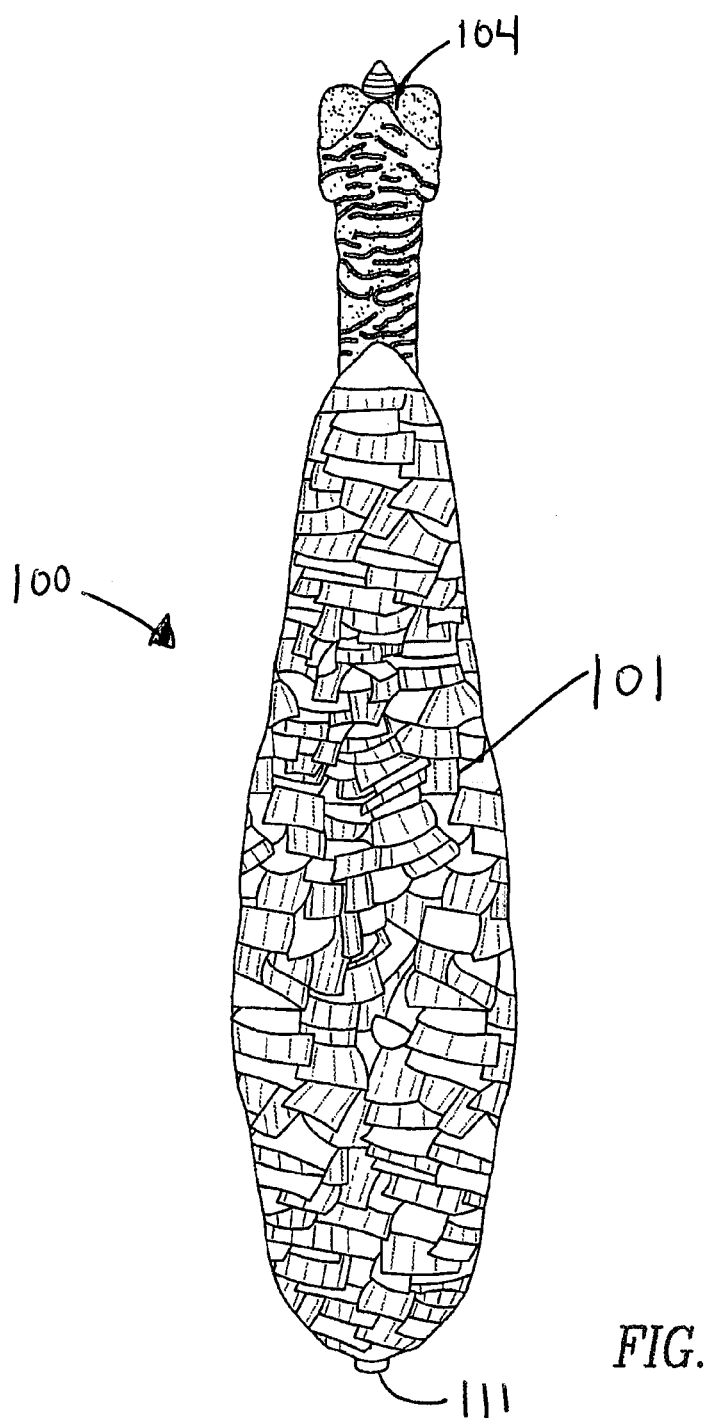
FIG. 4 is a back side view of the turkey decoy of FIGS. 1-3.
Figure 5:
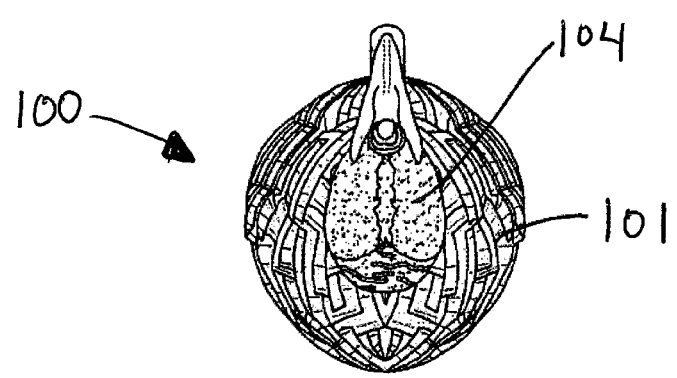
FIG. 5 is a top side view of the turkey decoy of FIGS. 1-4.
Figure 6:
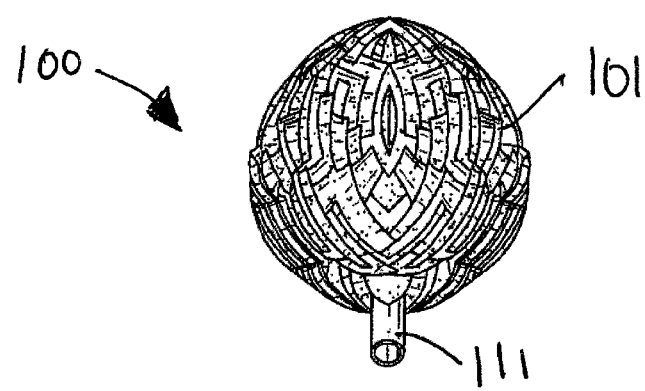
FIG. 6 is a bottom side view of the turkey decoy of FIGS. 1-5.

FIGS. 1-6 show a turkey decoy 100 of the present invention. The turkey decoy 100 may be a wild tom turkey having a head 104, neck 103, body 101 with a stake 111 inserted at a lower end of the body 101. The head 104 and neck 103 are normal sized being the same size as that of a real life mature tom turkey. The importance of the normal sized head and neck 103 is that the decoy 100 represents a male turkey which triggers a hierarchical investigation by live male turkeys. The head is in an alert position and the neck is in an extended position. The positioning of the head 104 and neck 103 represents a non-submissive posture that indicates a direct form of communication used among wild turkeys that the decoy 100 is welcoming confrontation.

The remaining body parts of the decoy 100 are dwarfed or have an abnormal configuration and are non-proportionate/not-to-scale when compared to a live mature tom decoy. For instance, the body 101 is elongated, slender and erect which is distinctly dwarf-sized and inferior when compared to a normal or real-life tom turkey. The body 101 is a fraction of the size of a normal mature turkey. The percentage or ratio of the size difference between the decoy 100 and a real-life turkey may vary but in all cases the decoy 100 will portray an inferior body size to a real-life turkey. The size of the body 101 is important because a real life tom turkey becomes confident of over powering the decoy 100 through aggression.

The body 101 is positioned to be erect allowing the head to be held at approximately or slightly less height than that of a normal size live tom turkey. The positioning of the head in this manner is important because it allows the decoy 100 to be seen over grass and other vegetation even when such vegetation grows high. The positioning of the head further indicates to other tom turkeys that the decoy 100 is not hiding but seeking challenge from live turkeys or sexual companionship.

Colors are used on the decoy 100 to elicit responses from live tom turkeys. The head 104 and neck 103 will have colors of a sexually aroused real-life tom turkey which is interpreted by the live tom turkey as being direct competition for breeding rights. The body 101 may be colored with colors of live tom turkey features and must be realistic and as close as possible to the colors of a live tom to be effective. Furthermore the body 101 may be molded to appear feathered or feather-like. For instance, the body 101 may be constructed with live turkey feathers, wrapped in feathered cloth or otherwise manufactured using methods that depict or provide feathers on the body 101. It should be noted that the materials used to construct the decoy 100 and the texture of the decoy 100 is less important than the dwarfed yet erect and non-submissive demeanor of the decoy 100.

A stake 111 is inserted in the lower portion of the body 101 which is used to mount the decoy 100 in the ground. The decoy 100 is shown without a tail, a beard or wings or wing feathers but may be constructed having such parts. As described above, since the size of the decoy 100 is smaller than other existing prior art turkey decoys, the decoy of the present invention is easy to handle and transport and especially useful for hunters who use "run and gun" tactics.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims. For instance, the decoy may depict other animals such as squirrels, deer, rabbits, etc all having diminished and dwarfed features when compared to its live counterpart.

The invention claimed is:
1. A tom turkey decoy comprising:
 a three-dimensional body having a substantial volume, said three-dimensional body being dwarfed and having a diminished size when compared to a body of a normal sized live mature tom turkey;
 a neck extending from the three-dimensional body, the neck being of comparable size and having comparable features, including a waddle, to the neck of the normal sized live mature tom turkey;

a head extending from the neck, the head being of a comparable size and having comparable features, including a snood, to the head of the normal sized live mature tom turkey, wherein the head and the neck are positioned on the body in an erect position; and a stake inserted into a lower end of the three-dimensional body oriented in a substantially vertical direction, wherein the entirety of the body extends below the neck along the substantially vertical direction.

2. The decoy of claim 1, wherein said three-dimensional body is elongated, slender, and erect.

3. The decoy of claim 1, wherein said head and neck are colored with colors that indicate sexual arousal.

4. The decoy of claim 1, wherein said decoy is depicted as being confrontational and aggressive.

5. The decoy of claim 1, wherein the three-dimensional body is a noticeable fraction of the size of the body of the normal sized live mature tom turkey.

6. The decoy of claim 1, wherein the head and neck are positioned in a non-submissive posture.

7. The decoy of claim 1, wherein the three-dimensional body, head and neck are in a posture that is configured to trigger a hierarchical investigation by live male turkeys.

8. A tom turkey decoy comprising:
a full three-dimensional body having a substantial volume, the full three-dimensional body being dwarfed in size when compared to a normal sized live mature tom turkey, the full three-dimensional body having a not-to-scale and noticeably diminished size when compared to a normal sized live mature tom turkey;

a neck extending from the three-dimensional body, the neck being of comparable size and having comparable features to the neck of the normal sized live mature tom turkey; and a head extending from the neck, the head being of a comparable size and having comparable features to the head of the normal sized live mature tom turkey, wherein the head and the neck are positioned on the three-dimensional body in a posture that is non-submissive and welcoming confrontation, wherein the head and the neck have the colors that indicate sexual arousal;

a stake inserted into a lower end of the three-dimensional body oriented in a substantially vertical direction, wherein the entirety of the body extends below the neck along the substantially vertical direction.

9. The decoy of claim 8, wherein the three-dimensional body is a noticeable fraction of the size of the body of the normal sized live mature tom turkey.

10. The decoy of claim 8, wherein said decoy is depicted as being aggressive.

11. The decoy of claim 8, wherein the posture is configured to trigger a hierarchical investigation by live male turkeys.

12. A method of hunting using a turkey decoy comprising:
providing a turkey decoy, said turkey decoy having a three-dimensional body having a substantial volume, a head, a neck, and a stake, wherein the three-dimensional body is dwarfed and diminished in size in comparison to a normal sized live mature tom turkey, said neck extending from the three-dimensional body, the neck being of comparable size and having comparable features to the neck of the normal sized live mature tom turkey, said head extending from the neck, the head being of a comparable size and having comparable features to the head of the normal sized live mature tom turkey, the stake inserted into a lower end of the three-dimensional body oriented in a substantially vertical direction, wherein the entirety of the body extends below the neck along the substantially vertical direction;

positioning the head and neck of the turkey decoy in an erect position;

mimicking the colors of the normal sized live mature tom turkey on the head and neck of the turkey decoy; and placing the animal decoy in a hunting environment.

13. The method of claim 12, wherein said head is positioned on the body to be at a height that is comparable to a head level of the normal sized live mature tom turkey that is standing in an erect position.

14. The method of claim 12, wherein said colors indicate sexual arousal of the decoy.

15. The method of claim 12, wherein said decoy is depicted as being confrontational and aggressive.

\* \* \* \* \*

UNITED STATES PATENT AND TRADEMARK OFFICE
CERTIFICATE OF CORRECTION

| | | |
|---|---|---|
| PATENT NO. | : 8,707,611 B2 | Page 1 of 1 |
| APPLICATION NO. | : 13/030229 | |
| DATED | : April 29, 2014 | |
| INVENTOR(S) | : Gregory Samaras et al. | |

It is certified that error appears in the above-identified patent and that said Letters Patent is hereby corrected as shown below:

In the Drawings:

DRAWING SHEET 1

Figure 1:
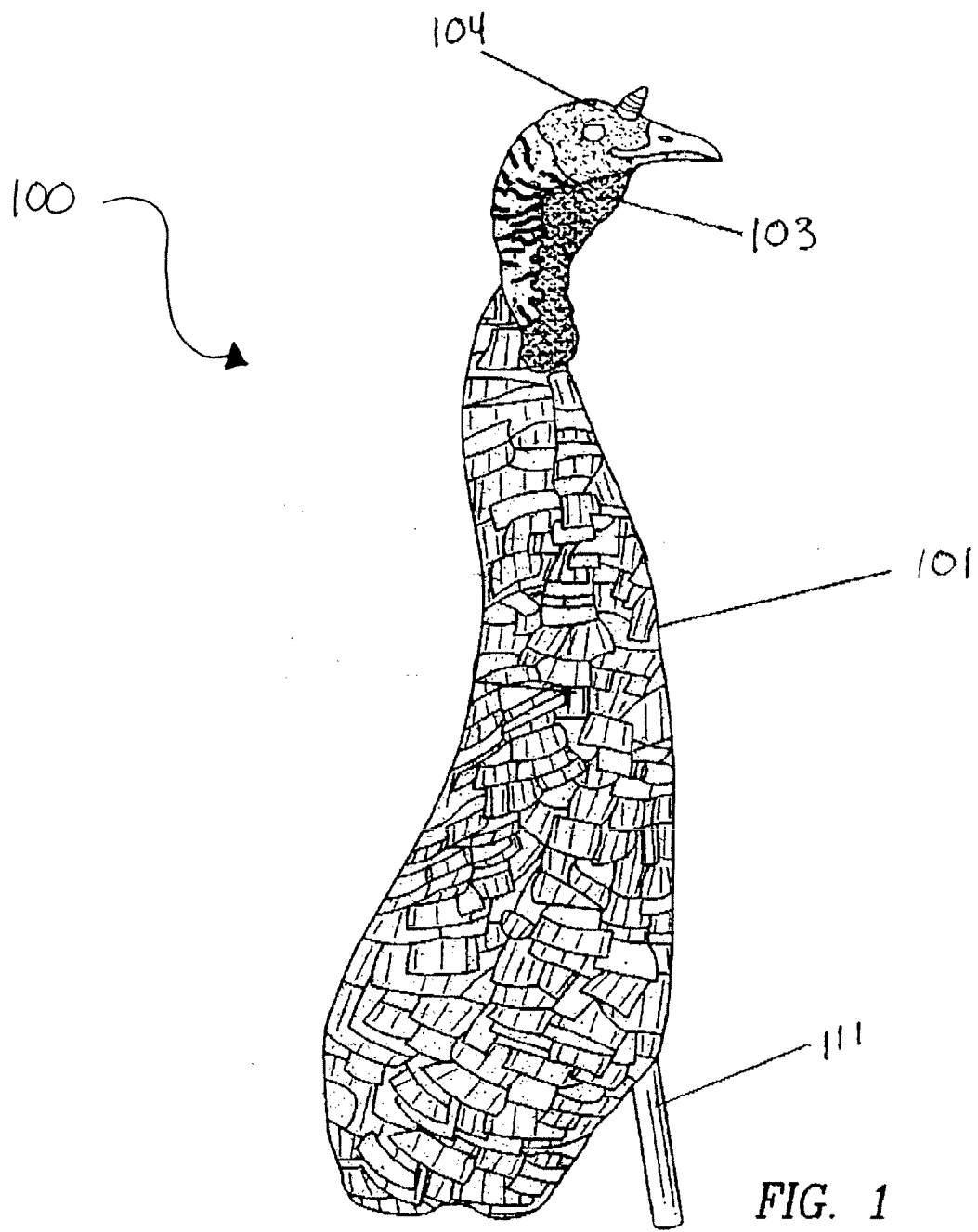
FIG. 1 is a right side view of a turkey decoy of the present invention.
Figure 1:
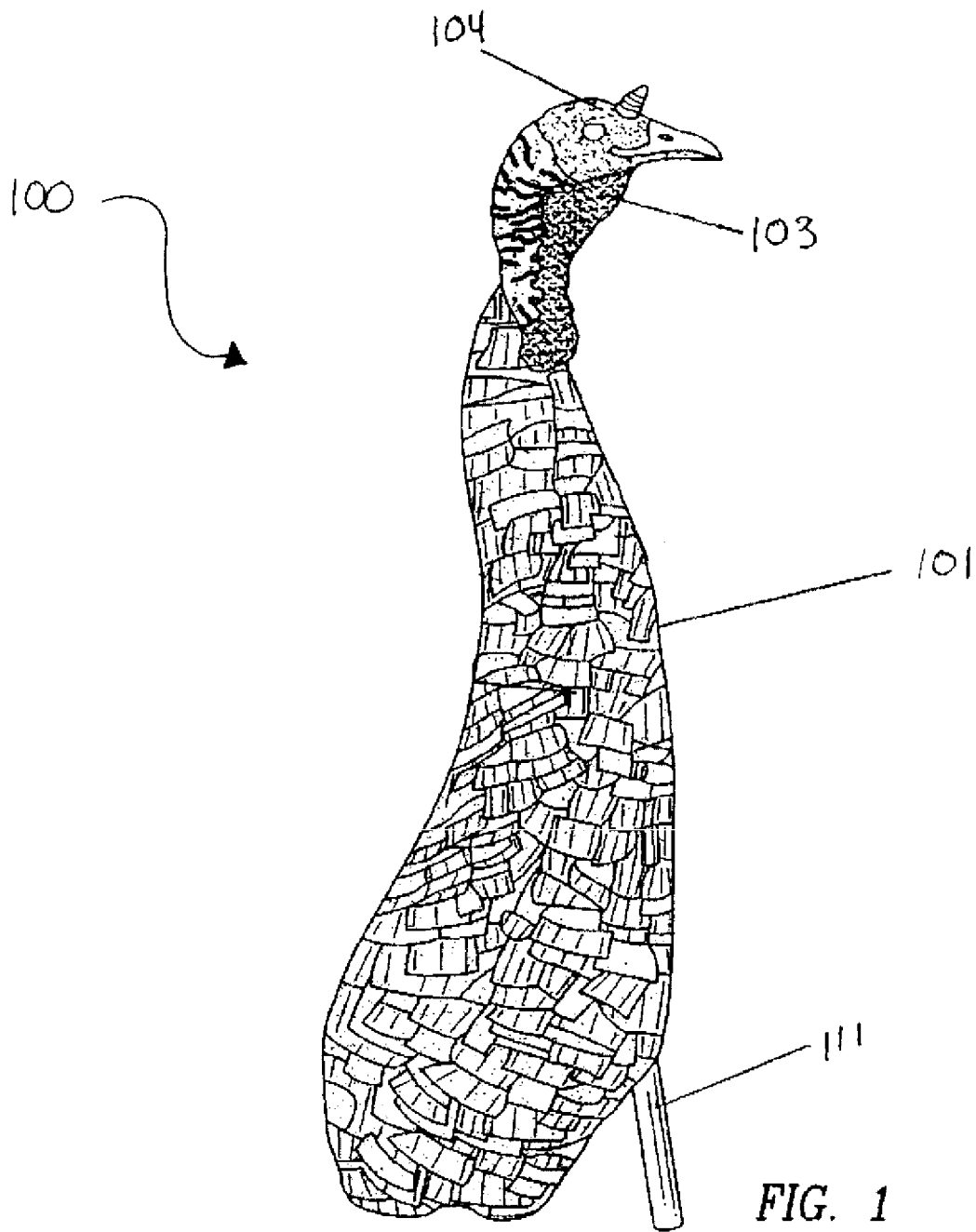

Please insert --FIG. 1-- under figure

Signed and Sealed this
Twelfth Day of August, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,707,611 B2 | Page 1 of 2 |
| APPLICATION NO. | : 13/030229 | |
| DATED | : April 29, 2014 | |
| INVENTOR(S) | : Samaras et al. | |

It is certified that error appears in the above-identified patent and that said Letters Patent is hereby corrected as shown below:

In the drawings

Drawing sheet 1 of 6, --FIG. 1-- should be inserted under drawing figure as shown here on the attached page Signed and Sealed this
Twenty-fourth Day of November, 2015

Michelle K. Lee
*Director of the United States Patent and Trademark Office*

UNITED STATES PATENT AND TRADEMARK OFFICE
CERTIFICATE OF CORRECTION

PATENT NO.       : 8,707,611 B2                                        Page 1 of 3
APPLICATION NO.  : 13/030229
DATED            : April 29, 2014
INVENTOR(S)      : Samaras et al.

It is certified that error appears in the above-identified patent and that said Letters Patent is hereby corrected as shown below:

Replace the Title Page with the attached Title Page.

In the drawings

Drawing sheet 1 of 6, --FIG. 1-- should be inserted under drawing figure as shown here on the attached page.

This certificate supersedes the Certificates of Correction issued August 12, 2014 and November 24, 2015.

Signed and Sealed this
Eighth Day of March, 2016

Michelle K. Lee
*Director of the United States Patent and Trademark Office*

(12) United States Patent
Samaras et al.

(10) Patent No.: US 8,707,611 B2
(45) Date of Patent: Apr. 29, 2014

(54) TURKEY DECOY

(76) Inventors: Gregory Samaras, Woodside, NY (US);
Edward J. Boll, Stuyvesant, NY (US);
Jason D. Michael, Turbotville, PA (US)

( * ) Notice: Subject to any disclaimer, the term of this patent is extended or adjusted under 35 U.S.C. 154(b) by 120 days.

(21) Appl. No.: 13/030,229

(22) Filed: Feb. 18, 2011

(65) Prior Publication Data
US 2012/0167445 A1 Jul. 5, 2012

Related U.S. Application Data

(60) Provisional application No. 61/429,656, filed on Jan. 4, 2011.

(51) Int. Cl.
*A01M 31/06* (2006.01)

(52) U.S. Cl.
USPC .......................................... 43/2; 43/3

(58) Field of Classification Search
USPC ............................................. 43/2, 3
IPC ......................................... A01M 31/06
See application file for complete search history.

(56) References Cited

U.S. PATENT DOCUMENTS 4,590,699 A * 5/1986 Nicks ................... 43/2
5,199,204 A * 4/1993 Lowery ................ 43/2

* cited by examiner

*Primary Examiner* — Darren W Ark
*Assistant Examiner* — Timothy Schwarz
(74) *Attorney, Agent, or Firm* — Schmeiser, Olsen & Watts, LLP

(57) ABSTRACT

A turkey decoy or other animal hunting decoy is provided depicting a live mature animal, wherein certain body parts are dwarfed and diminished in size in comparison to the live mature animal it depicts. The decoy will further have colors thereon mimicking colors of the live mature animal eliciting a sexual response from the hunted live animal.

15 Claims, 6 Drawing Sheets

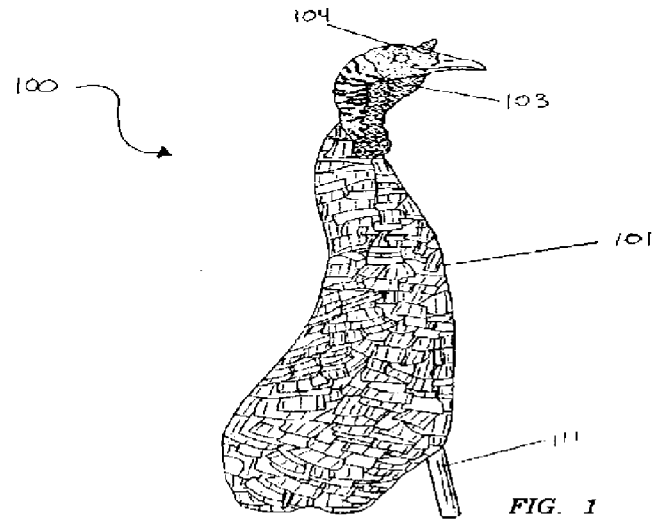

FIG. 1